Jan. 16, 1962 H. W. KULP 3,016,741
ACCESSORY FOR USE BY FISHERMEN
Filed Sept. 19, 1958 3 Sheets-Sheet 1
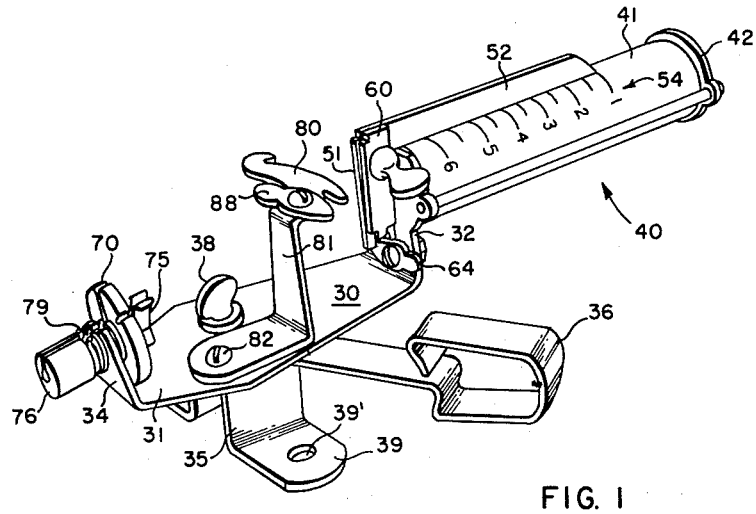
FIG. 1
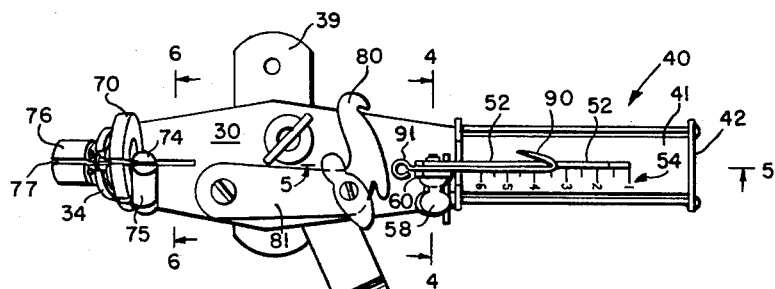
FIG. 2
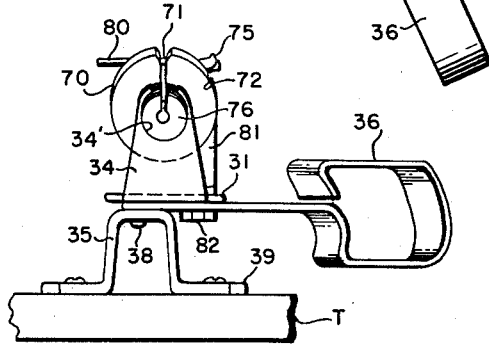
FIG. 3
FIG. 4
INVENTOR
HARRY W. KULP
BY
Joseph Allen Brown Jan. 16, 1962  H. W. KULP  3,016,741
ACCESSORY FOR USE BY FISHERMEN
Filed Sept. 19, 1958  3 Sheets-Sheet 2

INVENTOR
HARRY W. KULP
BY
Joseph Allen Brown

Jan. 16, 1962 H. W. KULP 3,016,741
ACCESSORY FOR USE BY FISHERMEN
Filed Sept. 19, 1958 3 Sheets-Sheet 3
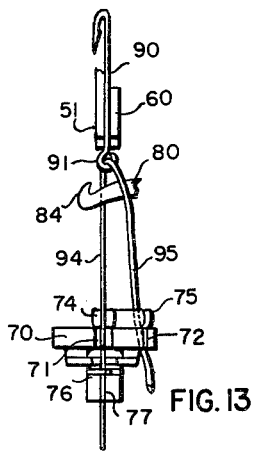
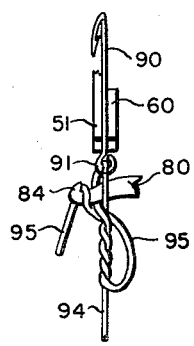
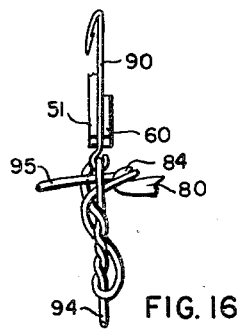
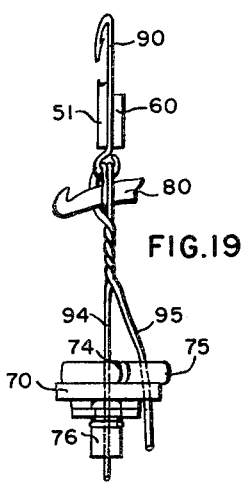
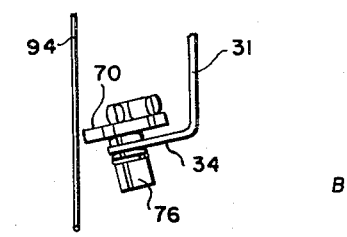
INVENTOR
HARRY W. KULP
BY
Joseph Allen Brown

United States Patent Office 3,016,741
Patented Jan. 16, 1962

3,016,741
ACCESSORY FOR USE BY FISHERMEN
Harry W. Kulp, 1350 Quarry Lane, Lancaster, Pa.
Filed Sept. 19, 1958, Ser. No. 762,154
9 Claims. (Cl. 73—143)

The present invention relates to accessories for use by fishermen.

Not infrequently, a fisherman will fish for many hours trying to hook a big one, only to lose him after he has been hooked. Sometimes the fish is lost because the knot which secures the fishing line to the hook slips. Sometimes, fishing has been done around rocks and the line has been weakened by rubbing against such rocks, and when the fish is hooked, the line snaps.

Heretofore, the tying of lines to hooks has generally been an inexact proposition. Sometimes, a knot is sufficiently secure. Other times, unknown to the fisherman, the knot is too loose. Often, improper tying methods are employed. Further, a fisherman who has used a given line many times, has no sure way of knowing if a line is worn beyond a desired point, particularly the section of line adjacent to the hook. Weaknesses in monofilament lines commonly used are difficult to detect.

One object of this invention is to provide a unitary device to assist in the tying of a line to a hook, or the like, and for testing the tie after it has been tied.

Another object of this invention is to provide a device of the character described with which a fisherman can tie his lines to hooks or the like in a shorter time than was heretofore possible and with more uniform, certain results.

Another object of this invention is to provide a device of the character described having means for securely holding strands of a line while a knot is being tied.

Another object of this invention is to provide in a device of the character described means for holding the hook while the knot tying operation is being performed.

Another object of this invention is to provide a device of the character described with which a fisherman can positively test a knot after it is tied to see if it meets with a minimum, predetermined strength requirement.

Another object of this invention is to provide a device of the character described with which various types of knots can be tied according to the desire of the user.

Another object of this invention is to provide in a device of the character described, means for cutting away surplus free end line after a knot has been tied.

Still another object of this invention is to provide in a device of the character described means whereby drag on a reel can be preset before fishing.

A further object of this invention is to provide in a device of the character described means whereby a fish can be weighed after it is caught.

A still further object of this invention is to provide a device of the character described which is of relatively simple construction and few parts, enabling it to be manufactured and sold at relatively low cost.

Other objects of this invention will be apparent hereafter from the specification and from the recital in the appended claims.

In the drawings:

FIG. 1 is a perspective view of the device of this invention;

FIG. 2 is a plan view of FIG. 1 and showing a hook clamped in the device;

FIG. 3 is an end view of the device, looking from the left of FIG. 2;

FIG. 4 is a fragmentary section taken on the line 4—4 of FIG. 2 looking in the direction of the arrows and illustrating the details of the clamping structure employed;

FIGS. 13 through 17 are generally diagrammatic plan views illustrating the preferred sequence and procedure for tying a knot to a hook using the device of this invention;

FIG. 18 is a perspective view showing the manner of using the device to test the strength of a tied knot;

FIG. 19 illustrates how a double loop knot may be tied with this device; and

FIG. 20 is a side elevation showing the device used for weighing purposes.

Figure 6:
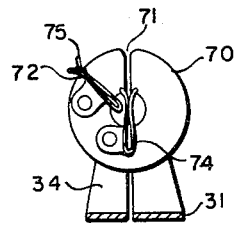
FIG. 6 is a section, on a slightly enlarged scale, taken on the line 6—6 of FIG. 2, looking in the direction of the arrows and showing part of the knot tying mechanism of the device.

Referring now to the drawings by numerals of reference, 30 (FIG. 1) denotes a frame which is illustrated in a horizontal position. However, as will subsequently appear, the frame may be otherwise disposed. Frame 30 has a base 31 upturned at its ends to provide a pair of spaced supports 32 and 34. Connected to the underside of the base is an inverted U-shaped bracket 35 and a handle 36. Both of these parts are connected to the base 31 by a wing screw 38 which threads into bracket 35. The extension of the bracket and handle can be varied at will by loosening screw 38, adjusting the members, and then tightening the screw.

Bracket 35 has lateral portions 39 provided with holes 39' whereby frame 30 can be fastened to the top of a tackle box T (FIG. 3) or other supporting element. In the absence of a supporting element, the device can be held by handle 36 with one hand, while the other hand is used to operate the device.

Figure 5:
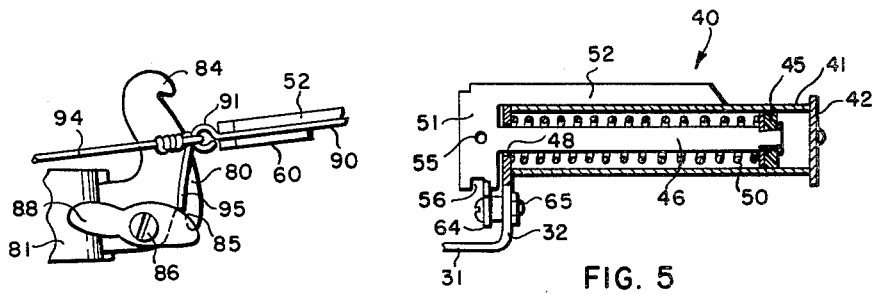
FIG. 5 is an enlarged, fragmentary section taken generally on the line 5—5 of FIG. 2 looking in the direction of the arrows, and showing the tension indicator of the device.

Support 32 has a tension indicator 40 suitably fastened to it. Such indicator comprises a fixed cylindrical casing member 41, closed at one end 42. Reciprocable in casing 41 is a piston 45 (FIG. 5) having a rod 46 one end of which projects through a slot 48 in support 32. Interposed between piston 45 and support 32 is a spring 50 which constantly urges the piston toward the end 42 of casing 41. The size of the piston is such relative to the inside diameter of the casing that when piston rod 46 is moved outwardly and then released, the return of the piston by spring 50 is cushioned by air trapped between the piston and end 42. Such air "bleeds" past the piston and thereby yieldably resists the piston's return.

Integral with the outer end of piston 46 is a plate 51 having a portion projecting downwardly toward base 31 of frame 30 and a portion projecting upwardly therefrom. The upwardly projecting portion has an integral pointer member 52 which extends along the periphery of casing 41 and cooperates with graduations 54 thereon.

As shown in FIGS. 1, 2, 18 and 20, casing 41 bears graduations which run from 1 through 6, which are pound designations, having reference to the value of spring 50 and movement of piston 45 thereagainst.

Plate 51 has a tapped hole 55 and its lower end is notched at 56. Mounted on the plate by means of a wing screw 58 which threads into hole 55 is a member 60 which together with the plate provides a vice or clamp like fastening means. Member 60 is adjustable toward or away from plate 51 and pointer 52 by tightening or loosening screw 58. The lower end of member 60 has an ear 61 (FIG. 4) which projects into notch 56 and prevents member 60 from pivoting when screw 58 is adjusted.

Figure 9:
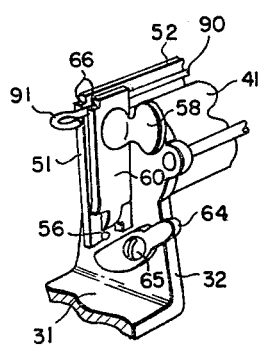
FIG. 9 is a fragmentary perspective view showing the latch employed to lock a pointer of the tension indicator in a fixed position, the latch being opened.

Ear 61 occupies only a portion of notch 56. Also projectable into notch 56 is a latch 64 pivoted on the shank of a bolt 65 connected to support 32. In FIG. 9, the latch is shown opened and in FIG. 10 it is shown closed. When in the position of FIG. 10, pointer 52, plate 51, and piston rod 46 are all locked to the support 32 of frame 30.

Pointer 52 and the upper end of member 60 have registering notches 66 to accommodate portions of a swivel or the like clamped between them.

Mounted on support 34 at the opposite end of frame 30 is part of a knot tying mechanism which comprises a rotor 70 having a pair of angularly spaced slots 71 and 72. Slot 71 extends from the periphery of the rotor to the axis thereof. Slot 72 is of short radial length. Riveted or otherwise secured to the side of rotor 70 facing tension indicator 40 are line grippers or holders 74 and 75 associated with slots 71 and 72, respectively. Each gripper comprises a U-shaped piece of resilient metal, between the legs of which a fishing line may be placed and yieldably held.

Connected to the face of rotor 70 remote from the tension indicator is a cylindrical knob 76, coaxially disposed relative to the rotor and provided with a longitudinally extending radial slot 77 which registers with slot 71. Slot 77 extends inwardly to the axis of the knob. The knob is carried on support 34 and is manually rotatable thereon. Knob 76 snaps into a suitable pocket 34' (FIG. 3) in the support.

Knob 76 has an annular groove 78 (FIGS. 7 and 8) in which a U-shaped retaining ring 79 is mounted and manually rotatable. When the open end of the ring is in register with slot 77, FIG. 7, a line may be deposited in the slot or removed therefrom. Further, after a line has been placed in slot 77, it may be held therein by rotating the ring, FIG. 8.

Figure 11:
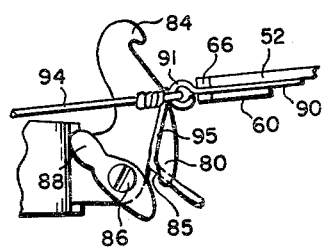
FIGS. 11 and 12 show the bail arm used in the knot tying operation and the means thereon for cutting away surplus line.
Figure 12:
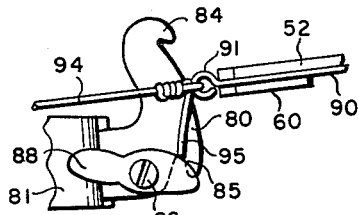

Disposed on frame 30 between tension indicator 40 and rotor 70 is a shiftable bail arm 80 integral with an L-shaped support 81 pivotally connected by bolt-nut means 82 to base 31. The bail arm extends generally parallel to base 31 and is spaced therefrom approximately the same distance as pointer 52. As shown best in FIGS. 11 and 12, the bail arm has a hook 84 at one end and a notch 85 at its opposite end. The portion of the bail arm surrounding the notch provides a stationary knife or shearing edge. Pivotal at 86 on the bail arm is a shear or cutter 88. When swung from the position shown in FIG. 11 to the position shown in FIG. 12, the shear sweeps across notch 85.

*Operation*

Figure 10:
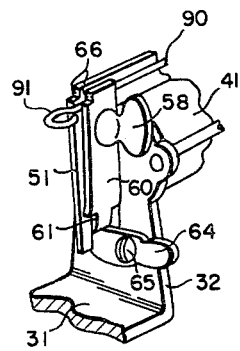
FIG. 10 is a view similar to FIG. 9 but showing the latch closed.

A fisherman uses the device described as follows:

Wing screw 58 is loosened and a fish hook 90 is positioned between pointer 52 and clamp member 60, with the eye 91 of the hook facing toward rotor 70. The body of the hook extends along casing 41 and is rigidly held in place by tightening down on the wing screw. Latch 64 is provided as shown in FIG. 10 whereby the pointer is locked to support 32.

Figure 7:
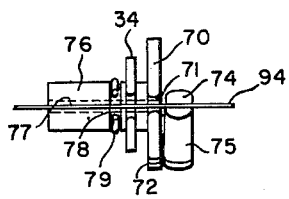
FIG. 7 is a plan view of FIG. 6 and showing a line retaining clip in an open position.
Figure 8:
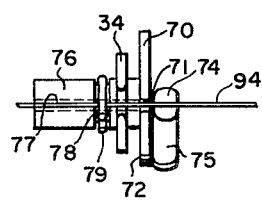
FIG. 8 is a view similar to FIG. 7 showing the line retaining clip in a closed position.

To tie a fishing line to the eye 91 of hook 90, the main body of the line, denoted 94, is deposited in slot 71 in rotor 70 and slot 77 in knob 76. Ring 79 is positioned as shown in FIG. 7 when the line is laid and then rotated to the position shown in FIG. 8 to hold the line from slipping out of slots 71 and 77. Also, line 94 is pressed into the resilient holder 74.

Bail arm 80 is disposed between rotor 70 and the fish hook, FIG. 13, and line 94 is then extended under the arm, the free end 95 being threaded up through eye 91 in the hook. Then the line is extended over the bail arm and back to the rotor where it is deposited in slot 72 and gripper 75.

When the line is thus positioned, rotor 70 is turned three, four or more times, as desired, by rotating knob 76, whereupon the line will become twisted as shown in FIG. 14. The twist will occur between the bail arm and the rotor. After twisting, the free end 95 of the line is removed from gripper 75 and passed over hook 84 of the bail arm, FIG. 15. When so hooked, support 81 is pivoted on frame 30 to withdraw the bail arm (FIG. 16) and thread the free end 95 of the line through the loop between the eye of the hook and the twisted section of line.

After the free end has been threaded through, it is removed from hook 84 and pulled to take up slack. Then holding the free end of the line with one hand, the main body 94 of the line is removed from the rotor and retaining ring with the other hand and pulled firmly to tighten up the knot coils. As the knot tightens, it draws up to the eye of the hook.

The bail arm is then swung back to a point where notch 85 is adjacent the tied knot. The free end strand 95 is placed in the notch, FIG. 11, and the shear 88 is pivoted, FIG. 12, to cut away the surplus line. The completed knot is shown in FIG. 17.

To test the knot, latch 64 is released (FIG. 9). With hook 90 still clamped to pointer 52, the line is pulled, FIG. 18. Piston 45, rod 46, plate 51, pointer 52 and hook 90 move relative to support 32 and casing 41, and against the resistance of spring 50. The pointer will indicate on the graduations 54 the amount of pull applied. If a desired pull is reached, such as four pounds, and the knot does not slip, it is known that the knot is tight enough. This same pull will also show if the body of the line in the region of the knot is sufficiently strong to take the pull.

When the eyes on hooks, lures or the like are made from gauge material heavier than that commonly used for #5 hooks, it is preferable that the line be double looped when the knot is tied. The procedure is the same as that described except that when the line is threaded through the eye of the hook, it is taken around the bail arm and through the eye of the hook a second time, as shown in FIG. 19. When the knot is tied, it is drawn up against a double loop instead of a single one, giving greater assurance that the knot will not slip. While a double loop is readily accomplished with this invention, it is very difficult to accomplish by any other method.

It is thus seen that with the device of this invention, the line is tied to the hook or the like. Then both the knot and the line is tested for strength merely by releasing the latch 64 and pulling on the line against the tension indicator. Surplus line is readily cut away using the shear 88.

Although the device has been described in tying a line to a hook clamped to pointer 52, a lure, swivel, snap, plug or the like can just as readily be placed in the clamp. This is because of the registering notches 66 in the pointer 52 and the upper end of member 60. Assuming that a line is to be tied to a swivel, for example, the body of the swivel could not be clamped because of its thickness. However, the eye of the swivel will readily fit between the pointer and member 60. By properly positioning the eye adjacent the corner formed by these parts, the notches 66 will provide a space for the threading of the line.

Moreover, in addition to tying and testing, the device can be used to preset the drag on the reel before fishing. A portion of the line can be clamped by member 60 and then latch 64 released, whereupon the drag on the line can be measured in pounds.

Further, after a fish has been caught, a weighing of the fish is possible. The fish line is merely clamped to the pointer and then frame 30 is held with handle 36. Handle 36 is swung to a position where it is in line with the casing 41 and frame 30 is disposed in a vertical position, FIG. 20. The structure of frame 30 is such that rotor 70 is removed slightly from the extension of the line as it hangs from the tension indicator, whereby an accurate weighing can be obtained. The removal of the rotor from the extension of the line as it hangs is accomplished by having support 34 tilted outwardly and away from support 32.

With this device, the commonly used stevedore hitch or one-half blood knot can be perfectly tied every time, even with gloves on, and with the mere flip of a latch the knot and line can be tested. Other knots can also be tied and the device otherwise used, for while the invention has been described in connection with a particular embodiment thereof and certain specific uses, it will be understood that it is capable of modification and other uses, without departing from the spirit of this invention. This application is intended to cover any variations, uses or adaptations as come within the scope of the invention and the limits of the appended claims.

Having thus described my invention what I claim is:

1. Apparatus for use in tying a line to a fishhook or the like and for testing the strength of the knot after the tie has been made comprising, in combination, a frame having a pair of spaced supports, a tension indicator mounted on one support, said tension indicator having scale means and a member cooperative therewith movable toward and away from the other support, means for detachably connecting a hook or the like to said movable member with an eye of the hook or the like facing said other support, a rotor mounted on said other support, and line gripping means on said rotor, said supports being so located that a free end of said line may be extended from said gripping means on said rotor to said one support, looped through said eye and then extended back toward said rotor whereby rotation of the rotor will form a twisted portion of line, said free end being projectable between said eye and said twisted portion to form a knot the strength of which can be tested by pulling the line in a direction away from said one support.

2. Apparatus as recited in claim 1 wherein latch means is provided between said frame and said movable member of said tension indicator to lock the movable member to the frame when said line is being looped through said eye.

3. Apparatus as recited in claim 2 wherein said line gripping means on said rotor comprises a pair of line grippers and the rotor has a pair of angularly spaced longitudinal slots, each adapted to receive a strand of said line, one slot being adjacent one line gripper and the other slot adjacent the other line gripper, and means being provided to rotate the rotor.

4. Apparatus as recited in claim 3, wherein said rotating means comprises a knob connected to the end of said rotor remote from said tension indicator, said knob having a slot registering with one of said rotor slots, and releasable means on said knob for closing said slot.

5. Apparatus as recited in claim 1 wherein said means for detachably connecting said hook or the like to said movable member comprises a clamp member adjustable toward and away from the movable member, said clamp and movable members having registering notches with which said eye of the hook or the like can be aligned to facilitate looping said line through said eye.

6. Apparatus for use in tying a line to a fishhook or the like and for testing the strength of the knot after the tie has been made comprising, in combination, a frame having a pair of spaced supports, a tension indicator mounted on one support, said tension indicator having scale means and a member cooperative therewith movable toward and away from the other support, means for detachably connecting a hook or the like to said movable member with an eye of the hook or the like facing the other support, a rotor mounted on said other support, said rotor having an axis extending generally in the same direction as the movement of said movable member, line gripping means on said rotor, a bail arm movably mounted on said frame and projectable between said eye and said rotor, and means on said bail arm for catching onto said line, said pair of supports being so positioned that a free end of said line may be extended from said line gripping means on said rotor to said one support, looped through said eye and then extended back toward said rotor whereby rotation of the rotor will form a twisted portion of line, said bail arm being movable to project said line catching means between the strands of the line and between said eye said twisted portion to catch onto said free end and pull it through on retraction of the bail arm to form a knot the strength of which can be tested by pulling the line in a direction away from said one support.

7. Apparatus as recited in claim 6 wherein said bail arm carries cutting means for removing surplus line after a tie has been made.

8. Apparatus as recited in claim 6 wherein said means on said bail arm for catching onto said line comprises a hook, and also provided on the bail arm is a cutting edge cooperable with a pivoted cutter, said cutter being supported on the bail arm.

9. Apparatus as recited in claim 6 wherein said tension indicator has spring means interposed between said movable member and said one support which resists movement of the movable member toward said other support, and means forming part of said tension indicator for cushioning the return of said movable member after it has been moved toward said other support.

References Cited in the file of this patent

UNITED STATES PATENTS

| | | |
|---|---|---|
| 465,894 | Stone | Dec. 29, 1891 |
| 1,260,869 | Carlson | Mar. 26, 1918 |
| 1,341,895 | Gamble | June 1, 1920 |
| 1,715,098 | Riley | May 28, 1929 |
| 2,072,037 | Kaplan | Feb. 23, 1937 |
| 2,458,669 | Yeamans | Jan. 11, 1949 |
| 2,590,498 | Bomberger | Mar. 25, 1952 |
| 2,678,229 | Shortland | May 11, 1954 |
| 2,734,299 | Masson | Feb. 14, 1956 |

FOREIGN PATENTS

| | | |
|---|---|---|
| 836,815 | France | Oct. 25, 1938 |